United States Patent [19]
Gucker

[11] 3,860,861
[45] Jan. 14, 1975

[54] DISK DRIVE HEAD POSITIONING SERVO INCLUDING TEMPERATURE RESPONSIVE SAFETY MEANS

[75] Inventor: George C. Gucker, Old Bethpage, N.Y.

[73] Assignee: Potter Instrument Company, Inc., Plainview, N.Y.

[22] Filed: Dec. 27, 1971

[21] Appl. No.: 212,450

[52] U.S. Cl. .............. 318/473, 317/13, 317/DIG. 1, 318/687, 317/40, 340/174.1, 318/561

[51] Int. Cl. .............................................. H02b 1/00

[58] Field of Search .................... 318/455, 471–473, 318/561, 687; 317/DIG. 1, 13; 340/174.1

[56] References Cited

UNITED STATES PATENTS

| | | | |
|---|---|---|---|
| 2,733,425 | 1/1956 | Williams et al. | 318/687 |
| 3,108,207 | 10/1963 | Haner et al. | 317/DIG. 1 |
| 3,250,465 | 5/1966 | Look | 318/472 X |
| 3,387,182 | 6/1968 | Fourr | 317/40 |
| 3,436,629 | 4/1969 | Adler | 318/687 |
| 3,502,944 | 3/1970 | Squiers | 317/13 C |
| 3,678,361 | 7/1972 | Takahashi et al. | 318/473 |

*Primary Examiner*—T. E. Lynch
*Attorney, Agent, or Firm*—Alfred W. Barber

[57] ABSTRACT

The specification and drawings disclose a head positioning servo system for disk drives in which the temperature of the servo motor is monitored. Power is applied to the motor only when its temperature is below a certain level.

24 Claims, 3 Drawing Figures

DISK DRIVE HEAD POSITIONING SERVO INCLUDING TEMPERATURE RESPONSIVE SAFETY MEANS

BACKGROUND AND SUMMARY

This invention relates to a head position servo system for magnetic disk information storage device and other similar apparatus and more particularly to a servo system which reduces the average time required to move the head among information tracks on the disks.

Magnetic disk information storage systems are widely used to store information in computer systems. Certain of such systems employ a linear servo motor to position the transducing heads with respect to the information tracks recorded on the surface of the disk.

As will be readily appreciated by those skilled in the art, the heat which the motor can dissipate is a factor limiting the average power which can be applied to it. Since the average time required to move the heads among the information tracks is a function of the power applied, heat dissipation is thus a factor which limits the average time required to move the head to a given information track. The average time is known in the art as the average access time.

Another factor limiting the average access time is the time required for the heads to reach a stable position after they have reached a desired information track.

In prior art disk drive systems the maximum power applied to accelerate the motor is limited to a value which will not cause excessive heating even if applied repeatedly in very rapid succession. Limiting the power in this manner increases the average time required to position the heads. In addition, the settling time in prior art disk systems is relatively long because the motor velocity decreases in relatively large increments as the head approaches the track.

A principal object of this invention, therefore, is the provision of an improved servo motor system for disk drives to minimize its average access time. Another object of the invention is to prevent overheating the head position servo motor.

Briefly, these and other objects of the invention are achieved by continuously monitoring the temperature of the motor and applying power to accelerate the motor so long as its temperature is below a predetermined level. If the motor temperature exceeds this level seek commands are inhibited until its temperature drops. The power applied is in excess of that which would cause detrimental heating of the motor if applied repeatedly in rapid succession. This provides improved acceleration as compared with prior art systems and an overall improvement in average access time.

THE DRAWINGS

Having briefly described this invention, it will be described in greater detail along with other objects and advantages in the following detailed description of a preferred embodiment which may be best understood by reference to the accompanying drawings. These drawings form part of the instant specification and are to be read in conjunction therewith. Like reference numerals are used to indicate like parts in the various views.

DESCRIPTION OF THE INVENTION

Figures 1, 2, 3:
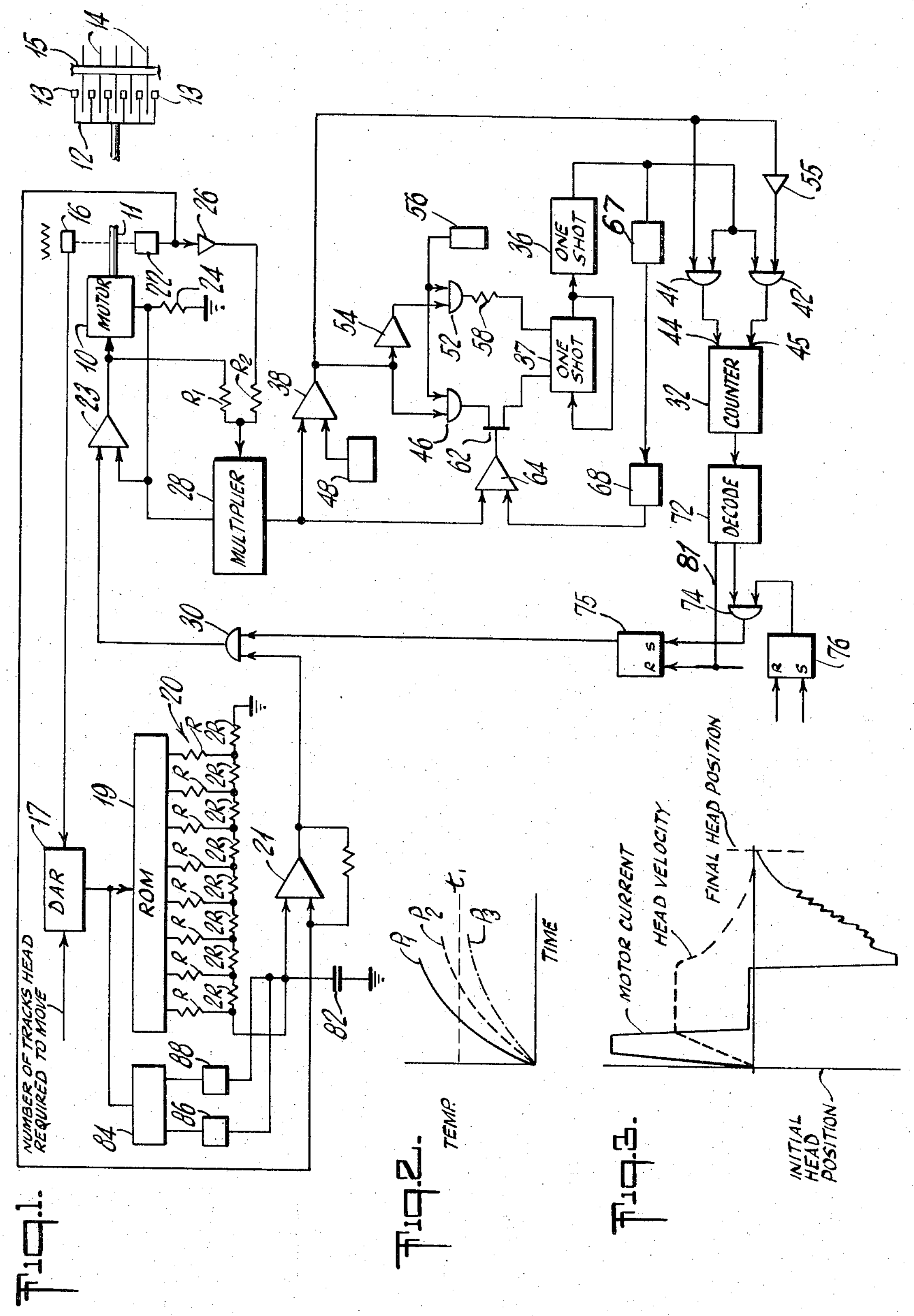
FIG. 1 is a schematic and block diagram of one embodiment of the invention.
FIG. 2 is a diagram showing illustratively motor temperature as a function of applied power and time.
FIG. 3 is a diagram showing idealized waveforms of motor current and head velocity.

Referring now to FIG. 1 of the drawings, a shaft 11 mechanically connects a transducing head 12 to the armature of a linear induction motor 10 of a suitable type well known in the art. In a typical application for which the instant invention is particularly well suited, the transducing head 12 is a comb-like device to which are attached a number of individual transducers 13 adapted to move respectively radially over the surfaces of a stack of magnetic disks 14 affixed to a common, rotating shaft 15. In moving the head 12 from an information track near the periphery of the disk (track 5, for example) to a track nearer the spindle 15 (track 30, for example), the difference between the present track address and the new track address (25 tracks) is computed in a manner well known in the art and then is coupled in binary form to an up-down counter 17. A transducer 16 which is mechanically coupled to the shaft 11 produces an output pulse each time the head moves through a distance equal to the distance between information tracks. This pulse output which is also coupled to the up-down counter 17 counts down the counter.

There is a head velocity profile for each distance through which the head must travel which will result in the minimum time to move the head from one track to another. To achieve an optimum head velocity profile, the head velocity is controlled so that it is a function of the distance between the instantaneous head position and the desired head position, as determined by the counter 17. A read only memory (ROM) 19 and R-2R resistive ladder network generally indicated by the reference numeral 20, can convert each count in the counter 17 to a unique analog error voltage which will provide an optimum head velocity profile. This analog voltage is coupled as one input to a differential amplifier.

It should be noted that although all counts in the counter 17 may be advantageously decoded to a particular analog error signal the resulting complexity and size of the required read only memory may make such a system impractical. Thus, it has been found that the same error voltage can be used for all distances exceeding a certain number of tracks (32, for example) with little degradation in performance and considerable reduction in the cost of the required read only memory.

The actual velocity of the head is measured by tachometer 22 coupled to the shaft 11. It generates an output signal proportional to the velocity of the head 12 and this output signal is coupled as the other input to differential amplifier 21.

An AND gate 30, which is disenabled whenever the temperature of the motor 10 exceeds the predetermined level, couples the output of differential amplifier 21 as one input to a second differential and power amplifier 23, whose output energizes motor 10. A small resistor 24 generates a signal proportional to the current flow through the motor and this signal is fed back as the other input to differential and power amplifier 23. Amplifier 23 thus maintains a current flow through the motor at a level dictated by the output voltage amplifier 21.

As FIG. 2 illustrates, the motor temperature is a function of the magnitude of the applied power and the duration of its application. The instantaneous applied power is determined, in the preferred embodiment of the invention, by multiplying of the motor current times the net voltage across the motor, which is equal to the applied motor voltage less the back emf of the motor. Since the signal generated across resistor 24 is proportional to the applied motor current, it is coupled as one input to a commercially available multiplying circuit 28. The applied motor voltage is coupled to one summing resistor $R_1$ and the output of tachometer 22, which is directly proportional to the back emf of the motor, is coupled via an inverting amplifier 30 to a second summing resistor $R_2$. Therefore, the potential at the common junction of $R_1$ and $R_2$ is equal to applied motor voltage less the back emf of the motor. A lead couples this common point to a second input terminal of multiplier 28.

An up-down counter 32 monitors the motor temperature in the manner hereafter described. Its count increases whenever the applied power exceeds a level ($P_2$, for example in FIG. 2) which, if maintained for a certain interval, can raise the temperature of the motor above an acceptable level ($T_1$, for example in FIG. 2). Thus, the rate at which the count increases is a function of the magnitude of the applied power and the count accumulated is a function of this rate and of the interval during which the power is applied. So long as the applied power is below the level of $P_2$, the count decreases at a fixed rate.

To provide a variable frequency oscillator whose output frequency is determined by the magnitude of the applied power, a pair of one shot multivibrators 37 and 36 are interconnected in a loop with the falling edge of one shot 37 triggering both itself and pulse shaping one shot 36. Because of self-triggering, one shot 37 is self-oscillatory at a frequency determined by external "resistive" control, as more fully described hereinafter. A pair of AND gates 41 and 42 couple an output of this variable frequency oscillator to the input terminals 45 and 46 of counter 32; pulses coupled to terminal 45 cause the counter to count down and pulses coupled to the terminal 44 cause the counter to count up.

The oscillating frequency of one shot 37 is determined selectively by either fixed resistor 58 or a field effect transistor 62 which serves as an electronically variable resistor. AND gates 52 and 46 respectively couple a reference potential 56 to the charging circuit of one shot 37 via resistor 58 or transistor 62.

The output of multiplier 28, which is proportional to the instantaneous applied power, is coupled as one input to a comparator amplifier 38 whose other input is connected to a reference source 48. When the output of multiplier 28 is below a certain level ($P_2$, for example) which level is determined by the magnitude of reference potential 48, the output of amplifier 38 enables gates 52 and 42 via inverting amplifiers 54 and 55 respectively. With gates 52 and 42 enabled counter 32 counts down at a fixed rate established by the magnitude of resistor 58.

A decoder 72 decodes the output of counter 32 and enables AND gate 74 when the count in counter 32 is below a predetermined count. It should be noted that even though the power levels during acceleration and deceleration are greatly in excess of what the motor can handle continuously, ($P_2$ of FIG. 2) the thermal time constant of the motor is an order of magnitude greater than the time required to complete any seek. Thus the predetermined count is selected such that for requested repeated successive seeks a delay is introduced before execution so as to insure that the motor will not exceed the critical temperature $T_1$ in FIG. 2.

When output of multiplier 28 exceeds the level established by reference potential 48, gates 46 and 41 are enabled causing the counter to count up at a rate determined by the magnitude of the applied power. In this situation a differential amplifier 64 controls the frequency of the oscillator of one shot 34 by controlling the resistance of field effect transistor 62. One input to amplifier 64 is coupled via integrating circuit 68 to the pulse whose width is shaped by one shot 36 and whose amplitude is limited by limiting circuit 67. As will be appreciated by those skilled in the art, as the output of multiplier 28 increases, the resistance of transistor 62 decreases thus increasing the frequency of shaped output pulses from one shot 36. If the count accumulated by counter 32 exceeds the predetermined level gate 74 is disenabled. A potentiometer (not shown) may be used to adjust the output pulse width of one shot 36 in order to provide a scale factor adjustment to get a desired frequency for a given input amplitude from multiplier 28.

In operation, the number of tracks the head is required to move is set in counter 17 and a flip flop 76 is set by a signal from the disk controller commanding the head 13 to move to a new track position. If the count of counter 32 is less than the predetermined count, indicating the motor temperature is below its critical temperature, gate 74 is enabled by outputs from decoder 72 and flip flop 76. The output of gate 74 sets a flip flop 75 whose output in turn provides one enabling input to gate 30.

The output of read only memory 19 is decoded and applied as one input to amplifier 21 whose other input is from head velocity transducer 22. Since the head is initially at rest, a large error signal appears at output of amplifier 21. The motor current rises quickly to a relatively large value and thereafter remains constant owing to saturation of the amplifiers until the desired head velocity is achieved. The error signal then decreases and the motor current drops to a very low level sufficient to maintain the head velocity.

As the head 12 moves, the output of transducer 16 reduces the count in counter 17. When this count reaches a certain value (32, for example) the read only memory 19 generates an error signal for each count which is decoded by ladder network 20 to generate an analogue error signal. To provide a smoothly decreasing head velocity all the way to zero in order to avoid head vibration and thereby reduce head settling time, an R-C integrator comprising the resistance of the R-2R ladder network and a capacitor 82 is employed. This integrator prevents any sudden change in requested head velocity and consequently prevents head vibration. Owing to the fact that the time required to travel a given incremental distance increases as the motor slows, it will be appreciated that the time constant of the R-C network which is chosen so that the capacitor is continuously discharging throughout most of the deceleration cycle is too short for the next to last increment. For this reason a decoding circuit 84 decodes the "One track to go" and "Zero track to go" counts. An output from decoder 84 energizes a current source 86 when there is one track to go. Current source 86 provides current flow to capacitor 82 so that its charge uniformly decreases throughout the entire interval between the time when sensor 16 senses the next to last and the last track. When the last track is sensed, circuit 88 is energized. This circuit provides a low impedance discharge path for capacitor 82 thereby bringing the requested velocity rapidly and smoothly to zero.

It should be noted that polarity of the error signal reverses and that the motor is decelerated by means of a reversed polarity current. When the head 12 reaches the desired track flip flops 75 and 76 are reset.

An additional output on line 81 from decoder 72 can be employed to reset flip flop 75 during a seek if the count accumulated by counter 32 exceeds a level which indicates the motor may be damaged due to heat during a seek. This adjunct of the invention insures that the motor will not be damaged even under the most severe combination of seek commands.

If the count in counter 32 initially exceeds the predetermined count, gate 74 is not enabled. In this circumstance, the motor remains unenergized and the head does not move until the counter has been counted down below the predetermined level. Although in this situation the access time may be longer when compared with prior art systems, the average access time is improved because higher accelerating and decelerating currents can be employed when the motor temperature is below its critical temperature. Further, by eliminating step decreases in motor current, a smooth, vibrationless decrease in motor velocity is obtained.

Although the present invention has been described with reference to a specific embodiment, it will be appreciated that a variety of changes may be made without departing from the scope of the invention. For example, certain features may be used independently and equivalents may be substituted.

What is claimed is:

1. An improved servo system for moving a transducer among information tracks in response to each of a series of signals commanding the transducer to move to a new track, comprising in combination:

a servo motor connected to said transducer for moving it from track to track;

means for monitoring the temperature of said servo motor;

said temperature monitoring means including means for generating an output signal when the temperature of said motor exceeds a predetermined temperature;

means for energizing said motor in a controlled fashion during starting, running and stopping such that said motor temperature exceeds said predetermined temperature in response to at least a certain series of command signals; and means responsive to said output signal to delay the energization of said motor in response to a command signal until the temperature of said motor drops a predetermined amount.

2. An improved servo system for moving, in response to a seek command signal, a head among information tracks recorded on a magnetic medium comprising in combination:

a servo motor connected to said head;

means for monitoring the temperature of said servo motor;

said temperature monitoring means generating an indicative output signal when the indicated temperature of said motor exceeds a predetermined temperature;

means for energizing said motor including means for generating a desired head velocity signal and means responsive to said indicative output signal to delay the energizing of said motor following the receipt of a seek command signal and wherein said delay extends until the indicated temperature of said motor falls below said predetermined temperature.

3. An improved servo system as in claim 1 wherein said temperature monitoring means includes means for generating a product signal which is a function of the product of the current flow through the motor and the net voltage across the motor.

4. An improved servo system as in claim 3 wherein said temperature monitoring means further includes;

an up-down counter a variable frequency oscillator whose output signal frequency is a function of the magnitude of the product signal;

means for coupling said oscillator output signal to said counter;

said coupling means causing said counter to count in one direction if said product signal exceeds a predetermined level and to count in the other direction if said product signal is less than said predetermined level; and means for decoding the output of said counter to produce said indicative signal.

5. An improved servo system as in claim 4 further including means responsive to the output of said decoding means to terminate a seek in the event the indicated temperature of said motor exceeds a safe level.

6. An improved servo system for moving a transducer among information tracks in response to each of a series of signals commanding the transducer to move to a new track, comprising in combination:

a servo motor connected to said transducer for moving it from track to track;

means for monitoring the temperature of said servo motor;

said temperature monitoring means including means for generating an output signal when the temperature of said motor exceeds a predetermined temperature.

means for energizing said motor in a controlled manner during starting, running and stopping;

said energizing means including; a) means for generating a reference signal which is a function of desired transducer velocity, b) means for generating a feedback signal which is a function of actual head velocity, and c) means for comparing said reference signal and said feedback signal to produce a control signal which controls the flow of current through the motor as a function of the difference between said reference and said feedback signals;

said reference signal generating means generating reference signals which are a function of the distance said transducer is to move and which cause said motor temperature to rise above said predetermined temperature in response to at least certain series of command signals; and means responsive to said output signal to delay the energization of said motor in response to a command signal until the temperature of said motor falls a predetermined amount.

7. An improved method for operating a servo system which moves a transducer among information tracks in response to each of a series of command signals, comprising the steps of:

controlling the current flow through the motor during starting, running and stopping the motor in such a manner that the motor will exceed a critical temperature in response to at least a certain series of command signals;

monitoring the temperature of said motor;

delaying the energization of said motor following a command signal when said motor exceeds said critical temperature until said temperature falls a predetermined amount.

8. An improved method for operating a servo motor system which moves a transducer among information tracks in response to each of a series of command signals comprising the steps of:

controlling the current flow through the motor during starting, running and stopping the motor in such a manner that;

a. the current flow through the motor is a function of the number of tracks the transducer is to move, and b. said motor exceeds a critical temperature in response to at least a certain series of command signals;

monitoring the temperature of said motor; and delaying the energization of said motor when in response to a command signal when said motor exceeds said critical temperature until said temperature falls a predetermined amount.

9. An improved servo system as in claim 6, wherein said delay extends until the temperature of said motor falls below said predetermined temperature.

10. An improved servo system as in claim 6 wherein said temperature monitoring means includes means for generating a product signal which is a function of the product of the current flow through the motor and the net voltage across the motor.

11. An improved servo system as in claim 10, wherein said temperature monitoring means further includes:

an up-down counter, a variable frequency oscillator whose output signal frequency is a function of the magnitude of said product signal;

means for coupling said oscillator output signal to said counter;

said coupling means causing said counter to count in one direction if said product signal exceeds a predetermined level and to count in the other direction if said product signal is less than said predetermined level; and means for decoding the output of said counter to produce said output signal.

12. An improved servo system as in claim 1 further including means responsive to said temperature monitoring means to interrupt the energization of said motor in the event the temperature of said motor exceeds a safe level.

13. An improved servo system as in claim 6 further including means responsive to said temperature monitoring means to interrupt the energization of said motor in the event the indicated temperature of said motor exceeds a safe level.

14. An improved servo system as in claim 6 wherein said reference signal generating means includes a read only memory, means for converting the read only memory to an analog signal, and a low pass filter for coupling the output of said converting means to one input of said comparator.

15. An improved servo system for moving a device in response to a command, comprising in combination;

a motion producing servo motor coupled to a device to be moved;

a command controlled source of power coupled to said motor for providing predetermined movement of said device;

means for sensing the instantaneous real power applied to said motor;

means for generating a signal in accordance with the magnitude of said sensed power;

means for augmenting said signal during the time the instantaneous sensed power is above a predetermined level;

means for diminishing said signal during the time the sensed power is below said predetermined level;

and means for delaying said command to apply power to said motor as long as said signal is greater than a predetermined amount.

16. An improved servo system for moving a device in response to a command, comprising in combination;

a motion producing servo motor coupled to a device to be moved;

a command controlled source of power coupled to said motor for providing predetermined movement of said device;

means for providing a command to apply power from said source to said motor;

means for sensing the instantaneous power applied to said motor;

a counter for providing a count responsive to the magnitude of said sensed power;

means for counting up in said counter during the time said sensed power is above a predetermined level;

means for counting down in said counter during the time said sensed power is below said predetermined level;

and means for delaying said command to apply power from said source to said motor whenever said count is above a predetermined count.

17. An improved servo system as set forth in claim 15, wherein;

said predetermined power level is a power level which if maintained for a certain interval can raise the temperature of the motor above an acceptable level.

18. An improved servo system as set forth in claim 16 wherein;

said predetermined power level is a power level which if maintained for a certain interval can raise the temperature of the motor above an acceptable level.

19. An improved servo system as set forth in claim 15 wherein;

the rate at which said signal is augmented is a function of the magnitude of the applied power and the interval during which the applied power is above said predetermined level.

20. An improved servo system as set forth in claim 16 wherein;

the rate at which said count is increased is a function of the magnitude of the applied power and the interval during which the applied power is above said predetermined level.

21. An improved servo system as set forth in claim 15, wherein;

said means for sensing the instantaneous real power applied to the motor includes means for sensing the total voltage across said motor less a voltage proportional to the instantaneous motor speed and the motor current.

22. An improved servo system as set forth in claim 16, wherein;

said means for sensing the instantaneous real power applied to the motor includes means for sensing the total voltage across said motor less a voltage proportional to the instantaneous motor speed and the motor current.

23. An improved servo system as set forth in claim 15, wherein;

said means for sensing the instantaneous real power applied to the motor includes means for sensing the instantaneous resistance of said motor and the current through said motor.

24. An improved servo system as set forth in claim 16, wherein;

said means for sensing the instantaneous real power applied to the motor includes means for sensing the instantaneous resistance of said motor and the current through said motor.

* * * * *